United States Patent [19]

Nakahara et al.

[11] Patent Number: 4,587,274

[45] Date of Patent: May 6, 1986

[54] PROCESS FOR PREPARATION OF FLUORINE-CONTAINING COMPOUND HAVING CARBOXYL GROUP

[75] Inventors: Akihiko Nakahara, Yamaguchi; Toshikatsu Sata; Masaki Shirouzu, both of Tokuyama; Kenji Kunai, Ayase, all of Japan

[73] Assignee: Tokuyama Soda Kabushiki Kaisha, Japan

[21] Appl. No.: 674,485

[22] Filed: Nov. 26, 1984

Related U.S. Application Data

[63] Continuation of Ser. No. 409,868, Aug. 20, 1982, abandoned.

[30] Foreign Application Priority Data

Aug. 24, 1981 [JP] Japan ............................ 56-131646

[51] Int. Cl.$^4$ .............................. C08J 3/28; C08F 8/06
[52] U.S. Cl. .................................. 522/126; 522/156; 204/157.79; 521/27
[58] Field of Search ...................... 204/159.18

[56] References Cited

U.S. PATENT DOCUMENTS

| | | | |
|---|---|---|---|
| 4,123,336 | 10/1978 | Seko et al. | 204/98 |
| 4,151,053 | 4/1979 | Seko et al. | 204/296 |
| 4,200,711 | 4/1980 | Onoue et al. | 525/388 |
| 4,265,366 | 12/1981 | Oda et al. | 204/296 |
| 4,267,364 | 5/1981 | Grot et al. | 521/27 |
| 4,399,183 | 8/1983 | Withers | 204/296 |

FOREIGN PATENT DOCUMENTS

125986  11/1978  Japan .

*Primary Examiner*—John C. Bleutge
*Assistant Examiner*—A. H. Koeckert
*Attorney, Agent, or Firm*—Sherman and Shalloway

[57] ABSTRACT

Disclosed is a process for the preparation of a fluorine-containing compound having a carboxyl group, which comprises irradiating a fluorine-containing compound having a sulfonyl group with ultraviolet rays in the presence of a nitrogen compound.

According to this process, a fluorine-containing compound having a carboxyl group can be prepared from a fluorine-containing compound having a sulfonyl group at a high efficiency very simply by one step.

11 Claims, No Drawings

PROCESS FOR PREPARATION OF FLUORINE-CONTAINING COMPOUND HAVING CARBOXYL GROUP

This application is a continuation of application Ser. No. 409,868, filed Aug. 20, 1982, now abandoned.

BACKGROUND OF THE INVENTION (1) Field of the Invention

The present invention relates to a novel process for preparing a fluorine-containing compound having a carboxyl group from a fluorine-containing compound having a sulfonyl group. More particularly, the present invention provides a convenient process in which a sulfonyl group of a fluorine-containing compound is converted to a carboxyl group at a high efficiency.

(2) Description of the Prior Art

Various proposals have heretofore been made on the process for converting a sulfonyl group contained in a fluorine-containing polymer to a carboxyl group. For example, we previously proposed processes in which a sulfonyl group (sulfonic acid group) is converted to a sulfonyl halide group and this sulfonyl halide group is subjected to an oxidizing treatment in the presence of an organic solvent (see Japanese Patent Application Laid-Open Specifications No. 132069/78 and No. 83982/79), the sulfonyl halide group is reacted with a phenol (see Japanese Patent Application Laid-Open Specification No. 20981/79) or the sulfonyl halide group is reacted with an amine (see Japanese Patent Application Laid-Open Specification No. 21478/79). Furthermore, there is known a process in which the sulfonyl halide group is treated with a reducing agent such as hydriodic acid (see Japanese Patent Application Laid-Open Specification No. 24177/77). These known processes, however, involve a number of steps, and they are disadvantageous from the economical viewpoint and in view of the process equipment.

SUMMARY OF THE INVENTION

We made researches with a view to eliminating the above disadvantages involved in the known processes, and to our great surprise, it was found that when a fluorine-containing polymer having a sulfonyl group is irradiated with ultraviolet rays in the presence of a nitrogen oxide, a carboxyl group is formed at a high efficiency in a short time. We have now completed the present invention based on this finding. We also found that in case of a fluorine-containing low-molecular-weight compound having a sulfonyl group, a carboxyl group can similarly be formed.

More specifically, in accordance with the present invention, there is provided a process for the preparation of a fluorine-containing compound having a carboxyl group, which comprises irradiating a fluorine-containing compound having a sulfonyl group with ultraviolet rays in the presence of a nitrogen oxide.

DETAILED DESCRIPTION OF THE PREFERRED EMBODIMENTS

Any of compounds having a fluorine atom and a sulfonyl group in combination can be used as the fluorine-containing compound having a sulfonyl group in the present invention, and both organic low-molecular-weight compounds and polymers may be used. As the fluorine-containing low-molecular-weight compound having a sulfonyl group, there can be mentioned, for example, a derivative

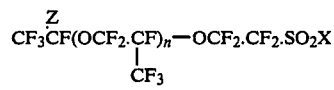

(in which Z is H, Cl or F, X is as defined hereinafter and n is an integer of from 0 to 6), which is obtained by ring-opening perfluorosulfone

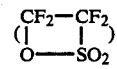

and oligomerizing the ring-opening product with hexafluoropropylene oxide, and a derivative $C_mF_{2m+1}$—$SO_2X$ (in which m is an integer of from 2 to 10 and X is as defined hereinafter), obtained by electrolytic fluorination of an alkane sulfonyl chloride. As the fluorine-containing polymer having a sulfonyl group, a perfluorocarbon type polymer is preferred. For example, there can be mentioned a homopolymer of a vinyl monomer having a sulfonyl fluoride group, for example, a compound

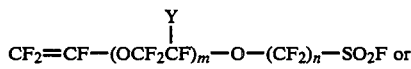

or

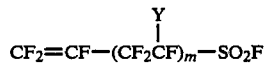

(in which Y stands for a fluorine atom, a trifluoromethyl group or a perfluoroalkyl group, and m and n are integers of from 0 to 5), a copolymer of this vinyl monomer with other fluorine-containing vinyl monomer such as vinylidene fluoride, tetrafluoroethylene, trifluoroethylene, chlorotrifluoroethylene or hexafluoropropylene, and a polymer formed by introduction of a sulfonyl group into a fluorine-containing polymer by a post treatment.

The sulfonyl group referred to in the present invention is a group represented by the general formula —$SO_2X$. For example, the sulfonyl group includes a sulfonic acid group (in which X is —OH), an alkali metal or ammonium salt (—$SO_3X'$) of the sulfonic acid group [in which X' is $Me^+$ or $N^+R_1R_2R_3R_4$ (in which $Me^+$ is a metal cation and $R_1$, $R_2$, $R_3$ and $R_4$ stand for a hydrogen atom or an alkyl group)], a sulfonic acid amide group (in which X is —NHR and R stands for a hydrogen atom or an alkyl group), a sulfonic acid ester group [X is —OR' (in which R' is an alkyl group)], a sulfonyl halide group (X is a chlorine, bromine, iodine or fluorine atom), and a sulfinic acid group or its salt [in which X is $H^+$, $Me^+$ or $N^+R_1R_2R_3R_4$ (in which $Me^+$, $R_1$, $R_2$, $R_3$ and $R_4$ are as defined above)].

The reactivity of the sulfonyl group to be converted to a carboxyl group according to the present invention differs to some extent according to its structure. Generally speaking, a sulfonic acid group and an ammonium salt thereof have a highest reactivity, and the reactivity of a sulfonic acid amide group and a sulfinic acid group comes next. The reactivity of a sulfonyl halide group and a sulfonic acid ester group is lowest. Among sulfonyl halides, sulfonyl iodide, sulfonyl bromide and sulfonyl chloride have ordinarily a good reactivity, and the reactivity of sulfonyl fluoride is often inferior. Metal salts of sulfonic acid and sulfinic acid are inferior to the foregoing compounds in the reactivity.

As a typical instance of the process for the preparation of a fluorine-containing polymer having a sulfonyl group such as mentioned above, there can be mentioned a process in which a mixture of a fluorine-containing vinyl monomer and a vinyl monomer having a sulfonyl fluoride group (the composition is adjusted according to the desired sulfonyl group content in the resulting fluorine-containing polymer) is polymerized according to a known polymerization method, for example, solution, emulsion or suspension polymerization carried out in the presence of an initiator at a temperature ranging from room temperature to 200° C. under a pressure of 1 to 250 Kg/cm². The obtained powdery polymer is used as it is or after it has been formed into a granule, fiber or film. In some case, a product having an enhanced mechanical strength, which is obtained by backing a molded film or membrane with a reinforcing member (net or the like), is preferably used.

The functional group, for example, (—SO$_2$F) of the so-obtained fluorine-containing polymer is converted to a desirable form such as mentioned above according to any of the following reactions.

Sulfonic acid group or its salt: (1)

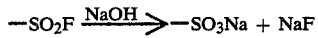

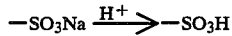

Sulfonic acid amide group: (2)

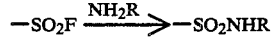

Sulfonic acid ester group: (3)

Sulfinic acid group or sulfonyl halide group: (4)

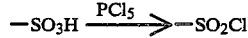

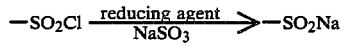

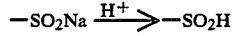

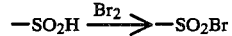

In the present invention, any of groups (1) through (4) is preferably used as the sulfonyl group. A sulfonic acid group, a sulfinic acid group, a sulfonyl halide group and a sulfonic acid amide group are especially preferred.

As the nitrogen oxide to be made present on irradiation with ultraviolet rays, there can be used N$_2$O, NO, NO$_2$ (or N$_2$O$_4$), N$_2$O$_3$, N$_2$O$_5$ and mixture thereof. Furthermore, compounds capable of being decomposed to form a nitrogen oxide such as mentioned above, for example, nitrosyl chloride, nitrosyl bromide, nitric acid, nitrous acid and esters thereof, can be used without any limitation. Among these nitrogen oxides, a gaseous nitrogen oxide such as NO or NO$_2$ (or N$_2$O$_4$) is preferred because it is easily available and its handling is very easy.

For contacting a fluorine-containing compound having a sulfonyl group with a nitrogen oxide such as mentioned above, there may be adopted a method customarily adopted for the gas or liquid optical chemical reaction system. More specifically, if the nitrogen oxide is gaseous, the nitrogen oxide is made present batchwise or continuously under reduced pressure or under pressure or under dilution with other inert gas such as nitrogen, helium or argon in the reaction system which is adjusted so that irradiation with ultraviolet rays from an ultraviolet ray lamp is uniformalized. In some cases, a good effect can be attained by the use of a sensitizer. If the nitrogen oxide is liquid at room temperature, the nitrogen compound is introduced by a metering pump as it is or after it has been diluted. It is sufficient if the amount charged of the nitrogen oxide is such that the nitrogen oxide is present in the reaction system at least in an amount equimolar to the sulfonyl group of the fluorine-containing polymer. Practically, in view of the advance of the reaction, the shape of the reaction vessel and the operation adaptability, it is preferred that the molar ratio of the nitrogen oxide to the sulfonyl group to be reacted be at least 10, or if the gaseous nitrogen oxide is used, the partial pressure of the nitrogen oxide be at least several mmHg. Use of a solvent is effective for uniformalizing the temperature in the reaction system, but since steps of removing the solvent and washing the reaction system are added, it is ordinarily preferred that the reaction be carried out in the gaseous phase.

In the present invention, the ultraviolet ray irradiation method is not particularly critical. Ordinarily, a mercury arc lamp, a hydrogen discharge tube, a xenon discharge tube and other known ultraviolet ray sources are used. Ordinary ultraviolet rays having a wave length of 2000 to 3000 Å are advantageously used. Moreover, far ultraviolet rays having a wave length shorter than 2000 Å can be used. When the fluorine-containing compound having a sulfonyl group is a powdery or granular polymer, it is preferred that means customarily adopted for reactions of powders, such as vibration or stirring, be adopted and irradiation with ultraviolet rays be carried out under fluidization. In case of a fibrous or filmy fluorine-containing polymer, there may be adopted a method in which the relative position of the fluorine-containing polymer to the ultraviolet ray source is fixed and ultraviolet rays having a certain intensity are applied batchwise. In the case where the fluorine-containing polymer is larger in the size than the ultraviolet ray source, especially in case of a filmy polymer, there may be adopted a method in which the filmy polymer is irradiated with ultraviolet rays while moving the filmy polymer relatively to the ultraviolet ray source continuously or intermittently.

According to the process of the present invention, from the industrial viewpoint, it is preferred that the irradiation treatment be carried out continuously so that conversion of the sulfonyl group to the carboxyl group is advanced rapidly. In the present invention, the irradiation dose of ultraviolet rays and the irradiation time are changed according to the intended use of the fluorine-containing compound obtained by the treatment of the present invention, the kind of the fluorine-containing compound used, the concentration of the nitrogen oxide to be made present in the reaction system, the reaction temperature and the shape of the reaction apparatus, and they are not simply determined. If the dose of ultraviolet rays is too large or the irradiation time is too long, it often happens that the decomposition reaction of the portion of the sulfonyl group preferentially takes place and no good results are obtained. Accordingly, it is preferred that the irradiation dose of ultraviolet rays and the irradiation time be determined in advance by a preliminary experiment according to the intended use of the fluorine-containing compound obtained by the treatment of the present invention. Ordinarily, the intended objects of the present invention can be attained if the irradiation is conducted for several minutes to several hours.

In the present invention, the temperature for the treatment of irradiating the fluorine-containing compound having a sulfonyl group with ultraviolet rays is preferably in the range of from room temperature to 250° C. Of course, temperatures outside this range may be adopted. For example, at a temperature approximating to 10° C., the reaction is advanced, though slowly. Furthermore, at a temperature higher than 250° C., the carboxyl group is sufficiently formed in some case. However, other side reactions such as partial decomposition of the carboxyl group take place, and especially in case of a fluorine-containing polymer, reduction of the physical properties, for example, deformation or degradation of the strength, is caused and no good results can be obtained.

When the fluorine-containing compound obtained by the treatment of the present invention is subjected to the infrared absorption spectrum analysis (according to the KBr method in case of a powdery, granular or fibrous polymer or to the attenuated total internal relfection method (the ATR method) or transmission method in case of a filmy polymer), a new absorption band, which has not been observed before the treatment, is produced at 1780 cm$^{-1}$, and if an alkali treatment is performed, this absorption band is shifted to 1680 cm$^{-1}$. Accordingly, it is confirmed that this absorption is attributed to the carboxyl group bonded to the perfluoroalkyl group. Under certain treatment conditions, an absorption band, which is considered to be attributed to the perfluoronitro group, is observed at 1610 cm$^{-1}$. On the other hand, the absorption band of the sulfonic acid group (in the case where the sulfonyl group is a sulfonic acid group), which is strongly observed at 1060 cm$^{-1}$ before the treatment, substantially disappears if slightly strong treatment conditions are adopted. If the irradiation treatment is carried out under mild conditions, the majority of the sulfonic acid group remains unreacted and formation of a small quantity of the carboxyl group is observed. Accordingly, it is confirmed that in the present invention, if the treatment conditions are appropriately set, it is possible to optionally adjust the state of the product in the range of from the state where a small quantity of the carboxyl group is contained in the sulfonic acid group, to the state where the sulfonic acid group is not substantially present but only the carboxyl group is present.

The process of the present invention is an advantageous process capable of converting the sulfonyl group to the carboxyl group at a high efficiency by one step. The process of the present invention is further characterized in that a thin layer in which the carboxyl group is present can be formed in a uniform thickness in the surface layer portion of the granular or filmy fluorine-containing polymer. Formation of this thin layer can easily be confirmed by the staining method. For example, the carboxyl group-present layer can be confirmed by staining the fluorine-containing polymer treated according to the process of the present invention in an acidic aqueous solution of Crystal Violet containing a swelling solvent such as an alcohol, cutting out a slice of the section of the stained polymer and observing the slice by a microscope.

Since the reaction of the process of the present invention is mainly carried out in the gaseous phase by using ultraviolet rays, not only a powdery, granular, fibrous or filmy polymer but also a polymer shaped into a bag or the like is advantageously treated according to the process of the present invention. For example, in case of a cylindrical bag, a plurality of ultraviolet ray sources are arranged so that the interior portion or inner surface of the cylinder is uniformly irradiated, and in this state, the treatment of the present invention is carried out.

The fluorine-containing compound having a carboxyl group, obtained by the treatment of the present invention, can be applied to the known uses without any limitation. For example, if the carboxyl group-containing polymer is soluble or in the form of a powder or granule, this polymer is effectively used for a catalyst, a pH controller, a special ion exchange resin or the like. In case of a filmy polymer, there can be obtained a membrane which is very effective and valuable as the ion exchange membrane for electrolysis of sodium chloride, on which extensive researches have recently been made. As a preferred ion exchange membrane for electrolysis of sodium chloride, there has been proposed a membrane having a sulfonic acid group on one surface and a carboxyl group on the other surface. According to the present invention, since it is possible to easily form a carboxyl group-containing thin layer having a thickness of several microns to scores of microns on the surface of a fluorine-containing polymer having a sulfonic acid group, it is possible to drastically reduce the thickness of the carboxyl group-present layer, which has a relatively high resistance. Accordingly, in the present invention, an electrolytic membrane having a much higher capacity than the conventional membranes can easily be prepared at a high efficiency by one step by using a simple apparatus.

In the present invention, a fluorine-containing compound having carboxylic acid groups included in both the surface portions may be prepared according to the following methods.

(a) Mercury arc lamps are disposed on both the side of a filmy fluorine-containing polymer and both the surfaces are simultaneously treated.

(b) By using one mercury arc lamp, one surface of a filmy fluorine-containing polymer is first treated and the other surface is then treated to produce carboxylic acid groups in both the surface portions.

In each of the foregoing two methods, the amounts of carboxylic acid groups imparted to both the surfaces may be the same or different. A fluorine-containing polymer in which all the sulfonic acid groups in one surface are substantially converted to carboxylic acid groups and the other surface is treated so that sulfonic acid groups and carboxylic acid groups are present in the mixed state at a ratio of, for example, 50/50, can be used effectively and suitably for the hydrolysis of an alkali metal salt. When this fluorine-containing compound is used for the hydrolysis of an alkali metal salt, it is preferred that the surface portion where only carboxylic acid groups are substantially present be faced to the cathode, because incorporation of the alkali metal salt in the formed alkali metal hydroxide can be controlled to a very low level.

From our experiences, it has been confirmed that an ion exchange membrane which is advantageously used for the electrolysis of sodium chloride is a membrane composed of a perfluorocarbon polymer having an ion exchange group bonded to the side chain through the ether linkage, which has a thickness of 0.02 to 1 mm. This ion exchange membrane has an ion exchange capacity of at least 0.3 meq/g of the dry resin, and a very thin carboxyl group-present layer having a thickness of 100 Å to 50μ is formed on one surface of the membrane. The amount of the carboxyl group in this thin layer is ordinarily 0.3 to 4.0 meq/g of the dry resin.

This special ion exchange membrane can easily be prepared according to the process of the present invention. For example, a membrane composed of a copolymer comprising

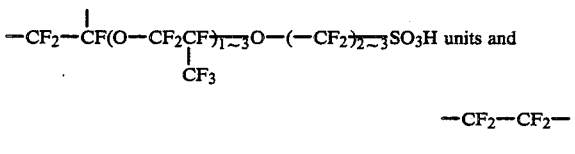

units and —CF$_2$—CF$_2$— units at such a ratio as providing the above-mentioned ion exchange capacity, this copolymer member backed by a reinforcing cloth of a perfluoroethylene polymer or an article formed by fusion-bonding membranes of the above copolymer to both the surfaces of the above cloth is used as the starting material, and this starting material is irradiated with ultraviolet rays in the presence of a nitrogen oxide in the gas or liquid phase, preferably in the gas phase, optionally after convertion of the group —SO$_3$H as the ion exchange group to other sulfonyl group. By this treatment, in one surface of the membrane, at least 50% of, preferably substantially all of, the sulfonyl group present in a region of a thickness of 100 Å to 50μ, preferably 2 to 20μ, from the surface can be converted to a carboxyl group.

The so-obtained ion exchange membrane has a very low electric resistance, and a current efficiency of at least 90% is obtained when sodium hydroxide is produced at a high concentration, for example, 35% by weight or more.

When the electrolysis of an aqueous solution of sodium chloride is performed by using the above-mentioned cation exchange membrane obtained according to the present invention, since the membrane has a two-layer structure in which a very thin layer containing mainly the carboxyl group and a layer containing the sulfonic acid group are included commonly in the matrix resin, peeling is not caused in the interface between the two layers at all and the electrolysis can be performed at such a high current density as 30 A/dm$^2$ or more.

However, since the thickness of the carboxyl group-present layer is very small, in some case, the cation exchange membrane, especially the carboxyl group-present layer, is worn away by contact with the electrode during the electrolysis. Accordingly, it is preferred that the ion exchange membrane obtained according to the present invention be used in such a state that the carboxyl group-present layer faces the cathode surface and the pressure in the cathode chamber be higher, preferably by at least 50 cmH$_2$O, than the pressure in the anode chamber. Furthermore, when a porous inorganic substance, especially a porous metal oxide, is deposited on the carboxyl group-present layer, a high protecting effect can be attained. Deposition can easily be accomplished by a known method, for example, a method in which the ion exchange membrane is heated to effect fusion bonding.

Moreover, the membrane obtained according to the present invention can advantageously be applied to energy-saving methods on which extensive researches have recently been made, for example, the solid polymer electrolyte method and the method in which the carboxyl group-present layer is coated with platinum or the like.

The present invention will now be described in detail with reference to the following Examples that by no means limit the scope of the invention.

EXAMPLE 1

A transparent film composed of a copolymer of tetrafluoroethylene and perfluoro-(3,6-dioxa-4-methyl-7-octene sulfonyl fluoride), which had a thickness of 0.18 mm and an ion exchange capacity of 0.91 meq/g of the dry resin when the sulfonyl fluoride group was hydrolyzed to a sulfonic acid group, was dipped in 1N HCl to convert the sulfonic acid group to the H$^+$ type.

A mercury arc lamp (GL-15 supplied by Toshiba) was placed in the central portion of a glass cylinder having an inner diameter of 8 cm and comprising two nozzles attached to the upper and lower portions thereof, and the above-mentioned film of the H$^+$ type having a size of 15 cm×20 cm was attached to the inner circumference of the so-assembled reaction vessel so that the surface of the film was uniformly irradiated with ultraviolet rays. The reaction vessel was immersed in an oil bath and the temperature was elevated to 140° C. while nitrogen was introduced at a flow rate of 50 cc/m from the nozzle. After elevation of the temperature, nitrogen was changed over to nitrogen monoxide, and nitrogen monoxide was introduced at the same flow rate to replace the irradiation atmosphere by nitrogen monoxide. The mercury arc lamp was connected to a stabilizer and was lighted up. The temperature of the surface of the film was elevated to 150° C. within several minutes from the lighting-up of the mercury arc lamp, and in this state, irradiation was continued for 30 minutes. Then, nitrogen monoxide was replaced by nitrogen and the reaction vessel was washed.

The film was taken out, and a part of the film was cut out and subjected to the infrared absorption spectrum analysis according to the ATR method. The remainder of the film was heated in methanol/water (1/1 volume ratio) containing 20% of NaOH to change the ion exchange group to the Na$^+$ type and then, the film was subjected to the staining test and the electrolytic test. It was confirmed that a medium intensity absorption band attributed to the carboxyl group was observed at 1780 cm$^{-1}$ and a new absorption band was observed at 1610 cm$^{-1}$ though the intensity was low. On the other hand, the absorption of the sulfonic acid group at 1060 cm$^{-1}$, which was observed on the non-irradiated surface, was hardly observed. A part (about 5 mm×about 10 mm) of the film, which had been converted to the Na$^+$ type, was dipped in a dyeing solution formed by dissolving 100 mg of Crystal Violet in 100 cc of 0.5N HCl/methanol (3/7 volume ratio) at room temperature for 15 hours. The section was sliced by a microtome and the slice was observed by a microscope. A layer having a thickness of $5\mu$ from the irradiated surface was not stained at all, but the other portion was dyed in a deep green color. Thus, it was confirmed that carboxyl groups were present in the portion having a thickness of $5\mu$ from the irradiated surface.

The results of the electrolytic test and electric resistance measurement made on the ultraviolet ray-treated film and the untreated film are shown in Table 1. The electrolytic test was carried out by using a two-chamber-type cell of a heat-resistant vinyl chloride resin having an effective electricity-applying area of 0.5 dm$^2$. Titanium mesh coated with titanium oxide and ruthenium oxide was used as the anode and mild steel mesh was used as the cathode. The film was interposed between anode and cathode chambers so that the film adhered to the anode but was separated by 2 mm from the cathode (in case of the irradiated film, the film was disposed so that the irradiated surface confronted the cathode). A saturated sodium chloride solution having a Ca concentration lower than 0.5 ppm was supplied into the anode chamber and the solution was discharged at a sodium chloride concentration of 3.5N. Pure water was supplied into the cathode chamber so that the NaOH concentration was 6N. The current density and electrode chamber temperature were adjusted to 30 A/dm$^2$ and 85° C., respectively. The electric resistance was measured at 80° C. in 6N NaOH by using a 1000-cycle alternating current by means of a glass cell.

TABLE 1

| Film | Cell Voltage (V) | Current Efficiency (NaOH) (%) | NaCl Concentration (ppm) in 50 % NaOH | Electric Resistance ($\Omega$) |
|---|---|---|---|---|
| ultraviolet ray-treated film | 3.23 (initial stage) 3.25 (after 6 months) | 96 (initial stage) 95 (after 6 months) | 30 40 | 1.0 1.0 |
| untreated film | 3.18 | 52 | 250 | 0.82 |

EXAMPLE 2

A membrane having a thickness of 0.35 mm was prepared by fusion-bonding a copolymer of tetrafluoroethylene and perfluoro-(3,6-dioxa-4-methyl-7-octene sulfonyl fluoride) having an ion exchange capacity of 0.83 meq/g of the dry resin when it was hydrolyzed, with a plain weave fabric of polytetrafluoroethylene (400-denier yarns were used as both the warps and wefts at densities of 50 warps per inch and 50 wefts per inch). The sulfonic acid group was changed to the H+ type according to customary procedures. The membrane was set in a reaction vessel composed of stainless steel, to one side of which a quartz window (10 cm $\times$ 15 cm) was attached so that irradiation with ultraviolet rays was possible through this window. A heater was attached to the other side of the stainless steel reaction vessel so that the temperature of the irradiated surface could be controlled. Two mercury arc lamps (SHL-100UV-2 supplied by Toshiba) were arranged in parallel so that they were apart by 5 cm from the quartz window. The temperature was elevated while a nitrogen/nitrogen dioxide mixed gas (20/1 volume ratio) was introduced into the reaction vessel at a flow rate of 100 cc/min. When the temperature of the irradiated surface was elevated to 110° C., the mercury arc lamps were lighted up. After passage of 15 minutes, irradiation was stopped. The temperature of the irradiated surface was found to rise to 140° C.

The reaction vessel was washed with nitrogen and the membrane was taken out from the reaction vessel. The infrared absorption spectrum and electrolytic characteristics were determined in the same manner as described in Example 1. From the results of the infrared absorption spectrum analysis, it was confirmed that the absorption band attributed to the carboxyl group, which was observed at 1780 cm$^{-1}$, had a medium intensity, and a weak absorption was observed at 1610 cm$^{-1}$ but the absorption attributed to the sulfonic acid group was hardly observed. At the electrolytic test, the cell voltage was 3.40 V and the current efficiency was 96%. When the NaOH concentration in the cathode chamber was increased to 8N, the cell voltage was 3.50 V and the current efficiency was 96%.

EXAMPLE 3

All of one surface of the copolymer film used in Example 1 before the hydrolysis (the —SO$_2$F type) was sealed with a Teflon adhesive tape, and the film was dipped in an ethylene diamine/water mixture (10/1 volume ratio) at 30° C. for 3 hours. Then, the tape was peeled and the film was hydrolyzed in methanol/water (1/1 volume ratio) containing 10 % of NaOH at room temperature for 15 hours. The film was washed several times with pure water rendered weakly acidic by hydrochloric acid. The film was air-dried and set in the same reaction vessel as used in Example 1 so that the ethylene diamine-contacted surface of the film was exposed to ultraviolet rays. The pressure in the reaction vessel was reduced and the gas in the reaction vessel was substantially removed. Then, nitrogen monoxide was sealed in the reaction vessel under a pressure of 1 Kg/cm$^2$ (gauge pressure), and the temperature in the reaction vessel was elevated to 160° C. and the mercury arc lamp was lighted up to start irradiation. Just after the start of irradiation, the temperature of the irradiated surface was elevated to 170° C. After passage of 1 hour, irradiation was stopped, and the interior of the reaction vessel was washed with nitrogen gas and the film was taken out. A comparative sample not irradiated with ultraviolet rays was prepared in the same manner as described above except that the mercury arc lamp was not lighted up. In this case, the reaction temperature was adjusted to 170° C. as in the above-mentioned case.

These two films were subjected to the infrared absorption spectrum analysis and electrolytic test in the same manner as described in Example 1. In case of the irradiation film, a strong absorption band attributed to the carboxyl group was observed at 1780 cm$^{-1}$, but any absorption band was not observed at 1780 cm$^{-1}$ at all in case of the non-irradiated film. The results of the electrolytic test are shown in Table 2. The same electrolytic apparatus and method as used in Example 1 were adopted, but the NaOH concentration in the cathode chamber was changed to 9N.

TABLE 2

| | Cell Voltage (V) | Current Efficiency (NaOH) (%) | NaCl Concentration (ppm) in 50% NaOH |
|---|---|---|---|
| non-irradiated film | 3.40 | 88 | 80 |
| irradiated film | 3.35 | 94 | 50 |

The staining test of these films was carried out in the same manner as described in Example 1, and another staining test was carried out by using an acidic dye. An aqueous solution containing 500 mg of Suminol Leveling Sky Blue R Extra Conc. (supplied by Sumitomo Kagaku), 1 g of acetic acid and 1 g of sodium acetate was used as the acidic dye solution. The dying operation was carried out at 80° C. for 15 hours. Sections of the stained films were sliced in the same manner as in Example 1, and the slices were observed by a microscope. In case of the non-irradiated film, the portion having a thickness of 50μ from the surface was dyed in a blue color with the acidic dye and the other portion was not dyed with the acidic dye, but the portion (about 130μ) not dyed with the acidic dye was dyed in a deep green color with the basic dye (Crystal Villet) and the other portion (50μ) was not dyed with the basic dye.

In case of the irradiated film, the portion having a thickness of 130μ from the non-irradiated surface was dyed in a deep green color with the basic dye but the other portion was not dyed with the basic dye. The portion having a thickness of about 5μ from the irradiated surface and the portion having a thickness of about 130μ from the opposite surface were not dyed with the acidic dye but the remaining intermediate portion having a thickness of about 45μ was dyed in a blue color with the acidic dye. From these results, it was found that a sulfonamide group-containing layer having a thickness of about 50μ from the surface was formed by the treatment with ethylene diamine and the carboxyl groups were formed in the portion having a thickness of about 5μ in the sulfonamide group-containing layer by the irradiation treatment with ultraviolet rays.

EXAMPLES 4 THROUGH 6

Powder A

The copolymer powder used in Example 3 was hydrolyzed and pulverized by a pulverizer under cooling with liquefied nitrogen to obtain a powder having a size smaller than 100 mesh. The powder was dipped in 1% aqueous ammonia with stirring to obtain a powder of the $NH_4^+$ type. The powder and a great excess of a $PCl_5/POCl_3$ mixture (2/10 weight ratio) were charged in a flask equipped with a stirrer, and reaction was carried out under reflux for 20 hours. Then, the content in the flask was developed in ice water, and the powder was recovered by filtration, washed with water and air-dried. When the infrared absorption spectrum was measured according to the KBr method, it was found that the absorption band 1060 cm$^{-1}$, which was attributed to the sulfonic acid group, disappeared but a new strong absorption band was observed at 1430 cm$^{-1}$, which was attributed to the sulfonyl chloride group. The so-obtained powder is designated as "powder A". A part of the powder A was taken and used for formation of powders B and C according to the following methods.

Powder B

The powder A was added to a great excess of a 15% aqueous solution of $Na_2SO_3$ and the reducing treatment was carried out at 50° C. for 8 hours. Then, the treated powder was washed with water, air-dried to remove water and subjected to the infrared absorption spectrum analysis according to the KBr method. It was found that the absorption attributed to the sulfonyl chloride group disappeared but absorption bands attributed to the sodium salt of the sulfinic acid group ($-SO_2Na$) were observed at 1020 cm$^{-1}$ and 940 cm$^{-1}$ instead. When this powder was used for the treatment according to the present invention, the powder was changed to the $H^+$ type by dipping in dilute HCl.

Powder C

The powder B was developed in a liquid mixture of 5 g of $Br_2$ and 50 g of $CCl_4$, and reaction was carried out at room temperature with stirring for 30 hours. After the reaction, the powder was recovered by filtration and washed with $CCl_4$, and after removal of $CCl_4$, the infrared Absorption spectrum was measured according to the KBr method. The absorptions at 1030 and 940 cm$^{-1}$, attributed to the sulfinic acid group, disappeared, and a new absorption band attributed to the sulfonyl bromide group ($-SO_2Br$) was observed at 1410 cm$^{-1}$.

In order to subject the powders A, B and C to the treatment of the present invention, the reaction vessel used in Example 1 was somewhat modified in the following manner. More specifically, the two nozzles of the reaction vessel were connected to each other through a pipe having a blower arranged in the midway thereof so that the gas in the reaction vessel was circulated.

The powder was charged in the bottom portion of the reaction vessel and the inner pressure was reduced by a vacuum pump. In case of the powders A and C, a nitrogen monoxide/helium mixed gas (1/10 volume ratio) was sealed in the reaction vessel under a pressure of 70 mmHg, and in case of the powder B, a laughing gas/argon mixed gas (10/1 volume ratio) was sealed in the reaction vessel under a pressure of 70 mmHg. When the temperature in the reaction vessel was elevated to 80° C., the blower was operated. The gas circulation rate was adjusted to that the powder was caused to float sufficiently. The mercury arc lamp was lighted up and irradiation was conducted for 2 hours. Then, the blower was stopped and the powder sedimented in the bottom portion of the reaction vessel was recovered. After the treatment, the infrared absorption spectrum was measured according to the KBr method, and after the powder was sufficiently converted to the $Na^+$ type in an alkali, the ion exchange capacity was determined according to the following method. Namely, a known amount of the powder, which has been converted to the $H^+$ type by dipping in an excess of methanol/dilute hydrochloric acid, was dipped with stirring for 20 hours in a liquid formed by mixing a methanol/water mixed solvent (1/1 volume ratio) with such an amount of NaCl as providing a concentration of 1N and an excess of 0.1N NaOH. The amount of NaOH left in the liquid was determined by back titration and the exchange capacity was calculated from this amount of NaOH. The obtained results are shown in Table 3.

TABLE 3

| Powder | Infrared Absorption Spectrum | Exchange Capacity (meq/g of dry resin) |
|---|---|---|
| A | absorption band at 1430 cm$^{-1}$ substantially disappeared, but new absorption band having medium intensity appeared at 1780 cm$^{-1}$ instead | 0.78 |
| B | absorption band of sulfinic acid group substantially disappeared, but new absorption band having weak intensity appeared at 1780 cm$^{-1}$ stead | 0.63 |
| C | absorption band at 1410 cm$^{-1}$ substantially disappeared, but absorp- | 0.72 |

TABLE 3-continued

| Powder | Infrared Absorption Spectrum | Exchange Capacity (meq/g of dry resin) |
|---|---|---|
| | tion band having medium intensity appeared at 1780 cm$^{-1}$ instead | |

EXAMPLES 7 THROUGH 11

In the same reaction vessel as used in Example 1, the same film as used in Example 1 was treated in the same manner as described in Example 1 except that the counter ion of the sulfonic acid group and the irradiation conditions were changed as shown in Table 4. The properties of the obtained films are shown in Table 4. The infrared absorption spectrum and electrolytic characteristics were determined in the same manner as described in Example 1.

TABLE 4

| | | Irradiation Conditions | | | | Electrolytic Characteristics | | |
|---|---|---|---|---|---|---|---|---|
| Example No. | Counter Ion | Temperature (°C.) | Time (min) | Nitrogen Oxide | Infrared Absorption Spectrum (ATR Method) | Cell Voltage (V) | Current Efficiency (%) | NaCl Concentration (ppm) in 50% NaOH |
| 7 | NH$_4^+$ | 150 | 30 | NO | absorption band at 1780 cm$^{-1}$ had medium intensity and absorption band at 1060 cm$^{-1}$ had weak intensity | 3.28 | 93 | 50 |
| 8 | Na$^+$ | 170 | 60 | NO | absorption band at 1780 cm$^{-1}$ had weak intensity and absorption band at 1060 cm$^{-1}$ had medium intensity | 3.23 | 84 | 90 |
| 9 | Ca$^{2+}$ | 130 | 50 | NO$_2$ | absorption band at 1780 cm$^{-1}$ had weak intensity and absorption band at 1060 cm$^{-1}$ had medium intensity | 3.24 | 79 | 100 |
| 10 | H$^+$ | 100 | 120 | NO | absorption band at 1780 cm$^{-1}$ had strong intensity and absorption band at 1060 cm$^{-1}$ disappeared | 3.27 | 94 | 50 |
| 11 | Na$^+$ | 170 | 120 | NO | absorption band at 1780 cm$^{-1}$ had weak intensity and absorption band at 1060 cm$^{-1}$ had medium intensity | 3.30 | 86 | 80 |

EXAMPLE 12

In 20 cc of ethyl ether was dissolved 1 g of

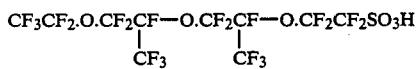

derived from an oligomer of

The solution was coated on a glass sheet while evaporating ethyl ether. The coated glass sheet was set in the reaction vessel used in Example 2 so that the coated surface could be irradiated with ultraviolet rays. The inside atmosphere of the reaction vessel was replaced by nitrogen monoxide and the temperature was elevated to 100° C. Irradiation with ultraviolet rays was conducted for 1 hour under the same conditions as adopted in Example 3. The reaction vessel was washed with nitrogen and the glass sheet was taken out. The infrared absorption spectrum of the material deposited on the glass surface was measured according to the KBr method. The absorption of the carboxyl group was observed at 1780 cm$^{-1}$, though this absorption had not been observed before the reaction.

Comparative Example 1

An ion exchange film was prepared in the same manner as described in Example 1 except that nitrogen was used instead of nitrogen monoxide. When the infrared absorption spectrum of the irradiated surface of the obtained ion exchange film was measured, any absorption band was not observed at 1780 cm$^{-1}$, and the absorption spectrum was the same as that of the non-irradiated film.

EXAMPLE 13

The treatment of the present invention was carried out in the same reaction vessel as used in Example 1 in the same manner as described in Example 1 except that laughing gas (N$_2$O) was used instead of nitrogen monoxide. A part of the treated film was cut out and subjected to the infrared absorption spectrum measurement. The remaining portion of the film was dipped in the same NaOH-water-methanol solution as used in Example 1 at room temperature for 2 hours to convert the film to the Na$^+$ type, and the film was subjected to the electrolytic test.

In the infrared absorption spectrum of the irradiated surface, the absorption band attributed to the carboxyl group was observed at 1780 cm$^{-1}$ with a weak intensity, and the absorption band of the sulfonic acid group at 1060 cm$^{-1}$ was left with an intensity corresponding to about ½ of the intensity of this absorption band of the non-irradiated surface. At the electrolytic test, when the NaOH concentration in the cathode chamber was 8N, the cell voltage was 3.35 V and the current efficiency was 92%.

EXAMPLE 14

A film composed of a copolymer of tetrafluoroethylene and CF$_2$=CFCF$_2$CF$_2$—O—CF$_2$CF$_2$SO$_2$F, which had a thickness of 0.15 mm and an ion exchange capacity of 1.21 meq/g of the dry resin after hydrolysis of the sulfonyl fluoride group, was hydrolyzed and the sulfonic acid group was converted to the ammonium type by dipping in a 0.5N aqueous solution of ammonium chloride. The film was attached to the same reaction vessel as used in Example 1, and the treatment of the present invention was carried out in the following manner.

Nitrogen dioxide diluted at a volume ratio of ⅓ by nitrogen was used as the nitrogen oxide instead of nitrogen monoxide and was sealed in the reaction vessel under atmospheric pressure. The temperature was elevated to 160° C. and the mercury arc lamp was lighted up, and irradiation was conducted for 1 hour. Then, air was fed into the reaction vessel, and the reaction vessel was washed and the film was taken out.

The obtained film was subjected to the staining test, infrared absorption spectrum measurement and electrolytic test in the same manner as described in Example 1. At the staining test, the portion having a thickness of 20μ from the irradiated surface was not dyed at all, and it was confirmed that carboxyl groups were present in this portion. In the infrared absorption spectrum of the irradiated surface, an absorption band having a strong intensity was observed at 1780 cm$^{-1}$ and the absorption band of the sulfonic acid group at 1060 cm$^{-1}$ was hardly observed. At the electrolytic test, when the NaOH concentration in the cathode chamber was 6N, the cell voltage was 3.33 V and the current efficiency was 95%. When the NaOH concentration was increased to 9N, the cell voltage was 3.40 V and the current efficiency was 96%.

EXAMPLE 15

A film composed of a copolymer of tetrafluoroethylene, $CF_2=CFCF_2CF_2CF_2CF_3$ and $CF_2-O-CF_2CF_2SO_2F$, which had a thickness of 0.15 mm and an ion exchange capacity of 1.1 meq/g of the dry resin after hydrolysis of the sulfonyl halide group, was set in a reaction vessel in which only one surface of the film could be contacted with a reaction liquid, and the film was dipped in an aqueous solution containing 20% of $NH_2.NH_2.H_2O$ at room temperature for 2 hours. Then, the film was dipped in a methanol/water liquid mixture containing 20% of NaOH at room temperature for 5 hours to hydrolyze the unreacted sulfonyl fluoride group. In the infrared absorption spectrum of the obtained film, the absorption band of the sulfonyl fluoride group at 1470 cm$^{-1}$ was not observed, but new absorption bands (attributed to the sulfinic acid group) were observed at 1030 and 940 cm$^{-1}$ in the surface contacted with the hydrazine hydrate solution and the absorption band of the sulfonic acid group was observed at 1060 cm$^{-1}$ in the other surface. The film was set in the same reaction vessel as used in Example 1 so that the sulfinic acid group-present surface confronted the mercury arc lamp. Nitrogen was introduced into the reaction vessel and the temperature was elevated to 120° C. Then, the pressure in the reaction vessel was reduced to 50 mmHg by a vacuum pump, and nitrogen monoxide was introduced so that atmospheric pressure was maintained in the reaction vessel. The mercury arc lamp was lighted up and irradiation was conducted for 2 hours. The interior of the reaction vessel was washed with nitrogen and the film was taken out. Another film was treated in the same manner as described above except that nitrogen dioxide was used instead of nitrogen monoxide. In the infrared absorption spectrum of the irradiated surface of each film, a weak absorption band was observed at 1780 cm$^{-1}$.

EXAMPLE 16

The sulfinic acid group-containing film obtained in Example 14 was dipped in a 0.5N aqueous solution of HCl to convert the film to the H$^+$ type. The obtained film was subjected to the treatment of the present invention with NO$_2$ and NO, independently, in the same reaction vessel as used in Example 15 in the same manner as described in Example 15 by using the sulfinic acid group-present surface as the surface to be irradiated. In each case, an absorption band having a medium density was observed at 1780 cm$^{-1}$ in the infrared absorption spectrum, and in case of NO$_2$, a weak absorption band was further observed at 1610 cm$^{-1}$. The obtained film was dipped in an aqueous solution containing sodium hypochlorite at 50° C. for 10 hours and the electrolytic test was then carried out. In case of the film obtained by using nitrogen monoxide, when the NaOH concentration was 8N, the cell voltage was 3.40 V and the current efficiency was 91%. In case of the film obtained by using nitrogen dioxide, under the same conditions, the cell voltage was 3.43 V and the current efficiency was 90%.

EXAMPLE 17

The sulfinic acid group-containing film obtained in Example 15 was dipped in a 3% aqueous solution of ammonium chloride or a 5% aqueous solution of dimethyl amine at room temperature to obtain a film of the ammonium type or dimethyl ammonium type. The film was subjected to the treatment of the present invention in the same reaction vessel as used in Example 15 in the same manner as described in Example 15 except that nitrogen monoxide was used for the film of the ammonium type or nitrogen dioxide was used for the film of the dimethyl ammonium type. When the infrared absorption spectrum was measured, a weak absorption band was observed at 1780 cm$^{-1}$ in each film. The film was treated with sodium hypochlorite in the same manner as described in Example 16 and the electrolytic test was carried out. When the NaOH concentration was 9N, the cell voltage was 3.42 V and the current efficiency was 90% in case of the film of the ammonium type, and the cell voltage was 3.40 V and the current efficiency was 88% in case of the film of the dimethyl ammonium type.

EXAMPLE 18

By using the same reaction vessel and ethylene diamine-treated film as used in Example 3, the treatment of the present invention was carried out in the same manner as in Example 3 except that nitrogen dioxide or laughing gas (N$_2$O) was introduced into the reaction vessel maintained at atmospheric pressure instead of nitrogen monoxide. In case of nitrogen dioxide, irradiation was carried out at 130° C. for 1 hour, and in case of laughing gas, irradiation was carried out at 160° C. for 2 hours.

In each case, the infrared absorption spectrum was measured. In case of the film obtained by using nitrogen dioxide, the intensity of the absorption band at 1780 cm$^{-1}$ was strong, but in case of the film obtained by using laughing gas, the intensity of this absorption band was weak. The results of the electrolytic test conducted at an NaOH concentration of 9N are shown in Table 5.

TABLE 5

| Nitrogen Oxide | Cell Voltage (V) | Current Efficiency (%) | NaCl Concentration (ppm) in 50% NaOH |
|---|---|---|---|
| nitrogen dioxide | 3.38 | 95 | 50 |
| laughing gas | 3.43 | 92 | 60 |

EXAMPLE 19

The same sulfonyl fluoride group-containing film as used in Example 14 was set in the same reaction vessel as used in Example 1, and the treatment of the present invention was carried out in the same manner as described in Example 1 except that nitrogen dioxide was used instead of nitrogen monoxide. In the infrared absorption spectrum of the obtained film, the intensity of the absorption band of the sulfonyl fluoride group at 1470 cm$^{-1}$ was somewhat reduced, but a new absorption band having a weak absorption intensity appeared at 1780 cm$^{-1}$. Thus, it was confirmed that carboxyl groups were formed.

EXAMPLE 20

The sulfonic acid group of the same film of the sulfonic acid type as used in Example 1 was converted to a sulfonic acid ester group according to customary procedures. The film was set in the same reaction vessel as used in Example 1, and the treatment of the present invention was carried out in the same manner as described in Example 1 except that nitrogen monoxide, nitrogen dioxide or laughing gas was sealed in the reaction vessel under atmospheric pressure. In the infrared absorption spectrum of each film, an absorption band was observed at 1780 cm$^{-1}$ though the intensity was weak.

EXAMPLE 21

The same film as used in Example 14 was treated in the same manner as described in Example 3 except that laughing gas was sealed in the reaction vessel under a pressure of 0.5 Kg/cm$^2$. In the infrared absorption spectrum of the obtained film, a weak absorption band was observed at 1780 cm$^{-1}$. At the electrolytic test of the film, when the NaOH concentration was 8N, the cell voltage was 3.38 V and the current efficiency was 89%.

EXAMPLE 22

A quartz plate having a thickness of 2 mm was attached to one side of a box-type stainless steel reaction vessel so that one surface of a filmy article could be irradiated with ultraviolet rays. The same film of the sulfonic acid type as used in Example 1 was set in this reaction vessel. $C_{10}F_{22}$ as the solvent for a nitrogen oxide was filled in a distance of about 5 mm between the quartz plate and the film so that the film was sufficiently dipped in the solvent. A stainless pipe having several holes sufficient to disperse a gas into the solvent was attached to the bottom between the quartz plate and the film. The reaction vessel was placed in a heater so that the temperature in the reaction vessel could be adjusted. A mercury arc lamp (H1000L—N supplied by Toshiba) was disposed in front of the quartz plate with a distance of 10 cm therebetween. Nitrogen monoxide was introduced at a flow rate of 5 cc/min into the solvent through the pipe. When the temperature of the solvent was elevated to 120° C., the mercury arc lamp was lighted up, and irradiation with ultraviolet rays was conducted for 1 hour. The film was taken out, washed with carbon tetrachloride at room temperature and subjected to the infrared absorption spectrum measurement. An absorption band attributed to the carboxyl group was observed at 1780 cm$^{-1}$ in the infrared absorption spectrum of the irradiated surface. At the electrolytic test of the obtained film, when the NaOH concentration was 9N, the cell voltage was 3.41 V and the current efficiency was 92%.

EXAMPLES 23 THROUGH 26

By using the same reaction vessel as used in Example 22, the treatment of the present invention was carried out in the same manner as described in Example 22 except that the film, nitrogen oxide and irradiation conditions were changed as shown in Table 6. The results of the infrared absorption spectrum analysis and electrolytic test of the obtained films are shown in Table 6.

TABLE 6

| Example No. | Film | Irradiation Conditions | | | Intensity of Absorption Band at 1780 cm$^{-1}$ | Electrolytic Test (NaOH Concentration = 8N) | | |
|---|---|---|---|---|---|---|---|---|
| | | Temperature (°C.) | Time (min) | Nitrogen Oxide (flow rate) | | Cell Voltage (V) | Current Efficiency (%) | NaCl Concentration (ppm) in NaCl |
| 23 | film used in Example 7 | 110 | 120 | NO$_2$ (5 cc/min) | weak | 3.39 | 90 | 70 |
| 24 | film used in Example 3 | 120 | 80 | NO$_2$ (10 cc/min) | weak | 3.40 | 90 | 80 |
| 25 | sulfonyl chloride group containing film* | 125 | 120 | NO (3 cc/min) | weak | 3.35 | 91 | 75 |
| 26 | film used in Example 16 | 120 | 90 | NO (5 cc/min) | weak | 3.36 | 89 | 80 |

Note
*film obtained by reacting the film used in Example 7 in POCl$_3$ containing 30% of PCl$_5$ under reflux for 10 hours and washing the treated film with CCl$_4$

EXAMPLE 27

The same film as used in Example 14 was dipped in 1N HCl to convert the film to the sulfonic acid type, and the film was set in the same reaction vessel as used in Example 1. The temperature was elevated to 165° C. while introducing nitrogen in the reaction vessel. Then, the inner pressure of the reaction vessel was reduced to substantially zero by a vacuum pump, and nitrogen monoxide was introduced into the reaction vessel under a gauge pressure of 0 Kg/cm$^2$ and the mercury arc lamp was lighted up. Irradiation was conducted for 1 hour and the lamp was put off. The interior of the reaction vessel was washed with nitrogen, and the film was taken out. The obtained film was subjected to the staining test, infrared absorption spectrum analysis and electrolytic test in the same manner as in Example 1.

At the staining test, the portion having a thickness of about 10μ from the irradiated surface was not dyed, and it was confirmed that carboxyl groups were present in this portion. In the infrared absorption spectrum of the irradiated surface, a strong absorption band was observed at 1780 cm$^{-1}$, and the absorption band of the sulfonic acid group observed at 1060 cm$^{-1}$ in the infrared absorption spectrum of the non-irradiated surface was hardly observed. The results of the electrolytic test conducted in the same manner as described in Example 1 except that the pressure in the cathode chamber was made higher by 20 cmH$_2$O than in the anode chamber and the NaOH concentration was changed as shown in Table 7 are shown in Table 7.

TABLE 7

| NaOH Concentration | Cell Voltage (V) | Current Efficiency (%) | NaCl Concentration (ppm) in NaOH |
|---|---|---|---|
| 6N | 3.18 | 92 | 60 |
| 8N | 3.22 | 94 | 40 |
| 10N | 3.26 | 95 | 30 |
| 12N | 3.33 | 95 | 25 |
| 14N | 3.39 | 94 | 20 |

EXAMPLE 28

In the same reaction vessel as used in Example 1, the treatment of the present invention was carried out in the same manner as in Example 1 except that the irradiation time was adjusted to 15 minutes, 30 minutes (Example 1), 1 hour or 2 hours. The obtained films were subjected to the staining test in the same manner as described in Example 1, and the thickness of the carboxyl group-present portion from the irradiated surface in each film was measured. The obtained results are shown in Table 8.

TABLE 8

| Irradiation Time | Thickness of Carboxyl Group-Present Portion from Irradiated Surface |
|---|---|
| 15 minutes | about 2μ |
| 30 minutes | about 5μ |
| 1 hour | about 10μ |
| 2 hours | about 20μ |

What is claimed is:

1. A process for the preparation of a fluorine-containing compound having a carboxyl group, which comprises irradiating a fluorine-containing compound having a sulfonyl group selected from the group consisting of a sulfonic acid group, an ammonium salt of a sulfonic acid group and a sulfonic acid amide group, with ultraviolet rays in the presence of a nitrogen oxide.
2. A process according to claim 1, wherein the sulfonyl group is a sulfonic acid group.
3. A process according to claim 1, wherein the sulfonyl group is a sulfonic acid amide group.
4. A process according to claim 1, wherein the fluorine-containing compound is a fluorine-containing polymer.
5. A process according to claim 4, wherein the fluorine-containing polymer is a copolymer of tetrafluoroethylene and a perfluoroalkylsulfonyl vinyl ether.
6. A process according to claim 4 or 5, wherein the fluorine-containing polymer is in the form of a film or membrane.
7. A process according to claim 6, wherein the membrane is an ion exchange membrane.
8. A process according to claim 1, wherein the nitrogen oxide is NO or NO$_2$.
9. A process according to claim 1, wherein the irradiation is carried out at a temperature in the range of from room temperature to 250° C.
10. The process of claim 1 wherein the nitrogen oxide is NO$_2$.
11. The process of claim 1 wherein the nitrogen oxide is NO.

* * * * *